(12) United States Patent
Sakurai et al.

(10) Patent No.: US 6,625,522 B2
(45) Date of Patent: Sep. 23, 2003

(54) VEHICLE CONTROL SYSTEM AND AUTOMOBILE USING THE SAME

(75) Inventors: Kohei Sakurai, Hitachi (JP); Nobuyasu Kanekawa, Hitachi (JP); Fumio Murabayashi, Urizura-machi (JP); Mitsuru Watabe, Urizura-machi (JP); Toshio Hayashibara, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/801,656

(22) Filed: Mar. 9, 2001

(65) Prior Publication Data

US 2002/0029098 A1 Mar. 7, 2002

(30) Foreign Application Priority Data

Sep. 4, 2000 (JP) .......................................... 2000-267023

(51) Int. Cl.$^7$ ................................................. G06F 7/00
(52) U.S. Cl. ................................. 701/1; 701/29; 701/31
(58) Field of Search ................................ 701/1, 29, 31, 701/34; 307/9.1, 10.1

(56) References Cited

U.S. PATENT DOCUMENTS 5,072,391 A * 12/1991 Abe ...................... 364/424.04
5,856,711 A *  1/1999 Kato et al. ................. 307/10.6

* cited by examiner

*Primary Examiner*—Yonel Beaulieu
(74) *Attorney, Agent, or Firm*—Crowell & Moring LLP

(57) ABSTRACT

A low-cost vehicle control system and a car using the system controls radiation of an actuator driver and thereby reduces the radiation component cost and allows downsizing of an electronic control unit to improve the versatility. The vehicle control system has an electronic control unit, a plurality of actuators and actuator drivers for driving the actuators at the actuator side. The actuator drivers, respectively, have an independent self-diagnosis section, a self-protection section, and a communication control section and are dispersed correspondingly to the actuators.

30 Claims, 8 Drawing Sheets

VEHICLE CONTROL SYSTEM AND AUTOMOBILE USING THE SAME

BACKGROUND OF THE INVENTION

The present invention relates to a control system of a vehicle such as a car and an automobile using the same, particularly to a vehicle control system capable of reducing the cost of the control system and an automobile using the same.

FIG. 11 is a block diagram of a conventional vehicle control system of a car or the like.

The vehicle control system 601 is constituted of an electronic control unit (ECU) 1', a plurality of sensors 2', and a plurality of actuators 3a', in which a predetermined operation is performed by the electronic control unit 1' set in a cabin in accordance with signals of the sensors 2' provided in the engine room of the vehicle to drive the actuators 3a'.

The electronic control unit 1' is constituted of an input interface (input I/F) 11', an arithmetic processing section 10', and an actuator driver 4', in which the input I/F 11' processes signals sent from the sensors 2' and outputs them to the arithmetic processing section 10', the arithmetic processing section 10' performs predetermined operations and outputs an optimum signal to the actuator driver 4', and the actuator driver 4' drives the actuator 3a' serving as a load through a connector 3b'. The actuator driver 4' is concentratedly set in the electronic control unit 1'.

In the above vehicle control system, an engine control system of a car is a system for optimally controlling an engine by performing predetermined operations by a microcomputer serving as an arithmetic processing section in an engine control unit serving as an electronic control unit in accordance with signals sent from an engine-speed sensor, a water-temperature sensor, and an intake-air-flow sensor, outputting a fuel injection signal to a driver for driving an injector and a switching signal and a valve-opening-degree adjustment signal to a driver for driving various valves and relay switches.

In the case of the vehicle control system 60' in FIG. 11, the actuator driver 4' is concentratedly set in the electronic control unit 1'. Moreover, there is a publicly-known example in which actuator drivers are dispersed not in an electronic control unit but by making the drivers respectively correspond to an actuator to be driven. The official gazette of Japanese Patent Laid-Open No. 79841/1996 discloses the art of a communication connector of a vehicle electronic controller for building each of the above dispersed actuator drivers in a connector connected to an actuator in order to improve the versatility of the actuator. Moreover, as other conventional examples of vehicle control systems, various arts are disclosed in the official gazette of Japanese Patent Laid-Open No. 275801/1999 and the like.

In the case of a vehicle control system, a comparatively large current (approx. several amperes) generally flows through an actuator driver when driving an actuator. The actuator driver frequently uses a power transistor or power MOS in which Joule heat is produced due to an on-resistance because the comparatively large current flows when power is turned on.

Therefore, as shown by the conventional vehicle control system 60' in FIG. 11, when the actuator driver 4' is concentratedly set to one place in the electronic control unit 1', a problem occurs that the calorific value of the whole of the electronic control unit 1' is increased by the actuator driver 4' serving as a heat-producing part and the increase of the calorific value may affect control.

Particularly, in the case of a recent car, the above electronic control unit tends to be set not in a cabin but in a vehicle engine room in order to reduce the harness cost and assembling man-hours and thereby the electronic control unit is exposed to a severer temperature environment. Therefore, to avoid the electronic control unit from being exposed to the environment, it is necessary to use a radiation component such as a heat sink or radiation fin in order to radiate heat. Thus, a problem occurs that the manufacturing cost and the cost of the whole vehicle control system in its turn increase.

In this case, as the control system disclosed in the Japanese Patent Laid-Open No. 8-79841 (1996), it is considered to make actuator drivers respectively serving as a radiation component correspond to an actuator to be driven and disperse the drivers to the actuator side. However, it is not sufficient to merely disperse the actuator drivers because the following are indispensable for a present engine control system: a self-diagnosis function for diagnosing a trouble such as a disconnection or short circuit of an actuator and communicating the diagnosed state to an arithmetic processing section of an electronic control unit, a self-protection function for preventing an actuator driver from being broken down due to overcurrent or overheat when the above trouble occurs, and a timer circuit when PWM (Pulse Width Modulation)-controlling the dispersed actuator in a multiplex communication system through a serial communication line.

That is, the present inventor obtained the new knowledge that in the case of a vehicle control system having an electronic control unit and a plurality of actuators, it is necessary to disperse actuator drivers to the actuator side in order to reduce the cost of the vehicle control system, provide a self-diagnosis section, a self-protection section, and a communication-control section for each of the actuator drivers and make the drivers independent in order to keep the reliability and functionality of the system even after the actuator drivers are dispersed. In the case of the above prior art, however, the actuator drivers are not dispersed to each actuator side separately from the electronic control unit or the actuator drivers are not dispersed to easily radiate heat even if the drivers are set to the outside of the electronic control unit. Moreover, the drivers are not independent drivers capable of constructing an actual system. Therefore, it is not particularly considered to maintain the reliability and functionality of the control system even if reducing the radiation-component cost of the vehicle control system by reducing the heat produced in the electronic control unit and dispersing the actuator drivers.

SUMMARY OF THE INVENTION

The present invention is made to solve the above problems and its object is to provide a vehicle control system for reducing the cost of the control system by dispersing actuator drivers and controlling the heat produced in an electronic control unit, making the actuator drivers independent and keeping the reliability and functionality of the control system even after dispersing the actuator drivers and provide a car using the system.

To achieve the above object, a vehicle control system of the present invention is a vehicle control system basically comprising an electronic control unit and a plurality of actuators. The control system has actuator drivers for driving the actuators at the actuator side and the actuator drivers are made independent by respectively having a self-diagnosis section, a self-protection section, and a communication control section and dispersed correspondingly to the actuators one-to-one.

In the case of the vehicle control system of the present invention constituted as described above, the actuator drivers are set to the actuator side separately from the electronic control unit and dispersed correspondingly to the actuators one-to-one. Therefore, it is possible to reduce the cost of the control system by controlling the heat produced in the electronic control unit. Moreover, because each of the actuator drivers is made independent as a system, it is possible to keep the reliability and functionality of the control system even after dispersing the actuator drivers.

Moreover, in the case of a specific mode of a vehicle control system of the present invention, the actuator drivers respectively have a timer section.

Furthermore, in the case of another specific mode of the vehicle control system of the present invention, the actuator drivers are built in connectors or adapters connected to the actuators, removably mounted on outsides of the connectors or adapters connected to the actuators and electrically connected with the connectors or adapters, or built in the actuators.

Furthermore, in the case of still another mode of the vehicle control system of the present invention, the communication control section of each of the actuator drivers has a serial communication control section or a radio communication control section.

Furthermore, the actuator drivers are fabricated on a semiconductor substrate and respectively used as an IC or directly mounted on a metallic member not through the substrate and formed integrally with connectors or adapters connected to the actuators or integrally with the actuators through mold mounting.

Furthermore, the electronic control unit is set in the engine room of a vehicle or in a car using the vehicle control system.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings.

DESCRIPTION OF THE PREFERRED EMBODIMENTS

The present invention will be discussed hereinafter in detail in terms of the preferred embodiments of a vehicle control system according to the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessary obscurity of the present invention.

Figure 1:
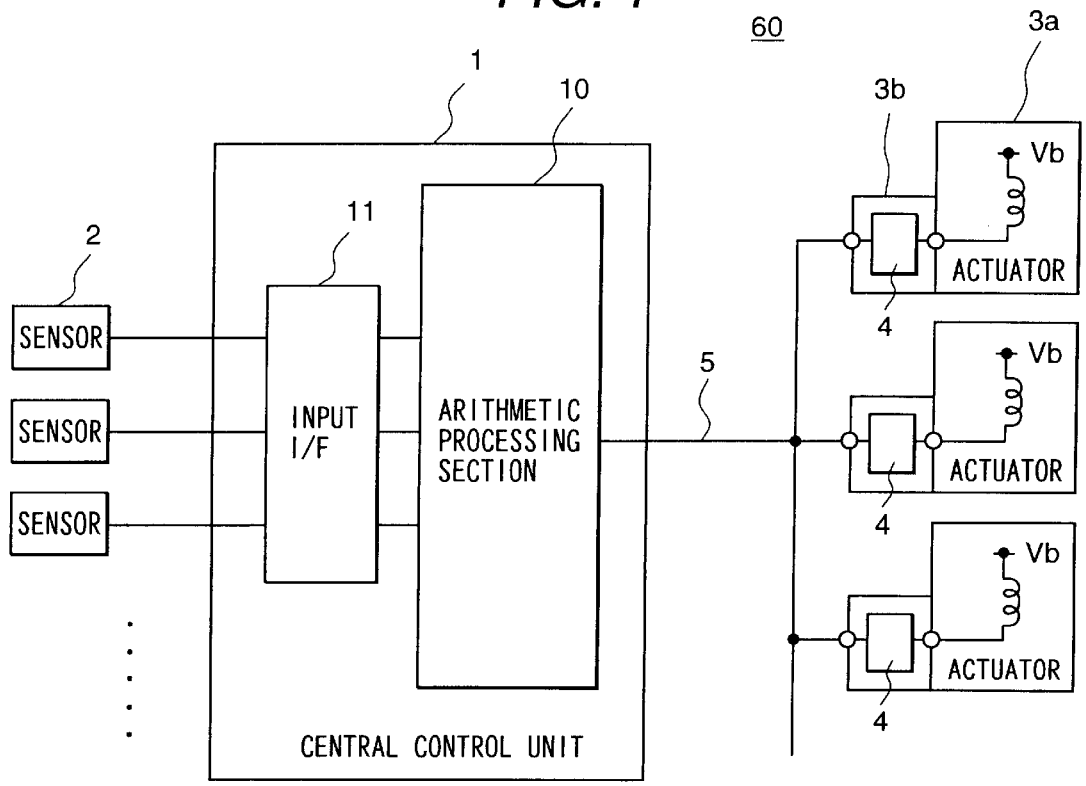
FIG. 1 is a block diagram of a vehicle control system of first embodiment of the present invention.

FIGS. 1 to 4 show the vehicle control system of the first embodiment, in which FIG. 1 shows a block diagram of the vehicle control system.

The vehicle control system 60 is constituted of an electronic control unit (ECU) 1, a plurality of sensors 2, a plurality of actuators 3a, and a plurality of actuator drivers 4, in which predetermined operations are performed by the electronic control unit in the engine room of a vehicle in accordance with signals of the sensors 2 set in the engine room to drive the actuators 3a serving as loads through the actuator drivers 4.

The electronic control unit 1 is constituted of an input interface (input I/F) 11 and an arithmetic processing section 10. The actuators 3a are driven by the actuator drivers 4 and the actuator drivers 4 are set to the actuator-3a side separately from the electronic control unit 1 and dispersed correspondingly to the actuators 3a.

The actuator drivers 4 are built in connectors 3b connected to the actuators 3a and connected with the arithmetic processing section 10 of the electronic control unit 1 by one serial communication line 5. Then, the arithmetic processing section 10 captures signals obtained by processing signals of the sensors 2 from the input I/F 11, the microcomputer serving as the arithmetic processing section 10 performs predetermined operations and outputs an optimum control signal to the actuator drivers 4, and the actuator drivers 4 drive the actuators 3a.

Figure 2:
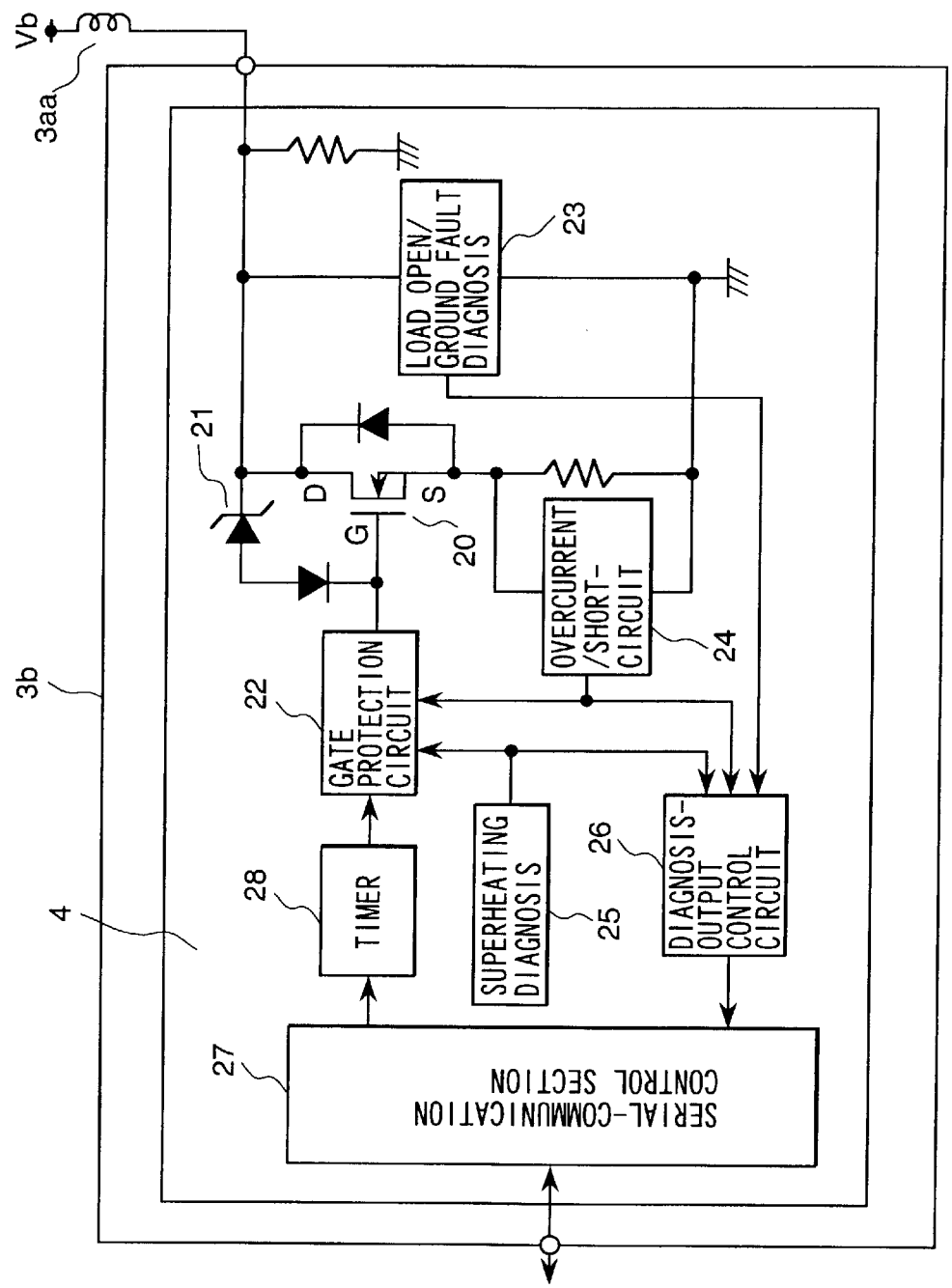
FIG. 2 is a circuit block diagram of an actuator driver constituting the vehicle control system in FIG. 1.

FIG. 2 is a circuit block digram of one of the actuator drivers 4. The actuator drivers 4 respectively have a self-diagnosis section, a self-protection section, a timer section, and a communication control section and are independent so as to make it possible to construct an actual system even if the drivers are set to the outside of the electronic control unit 1. That is, as shown in FIG. 2, each actuator driver 4 built in each connector 3b includes an N-type power-MOS transistor 20, a Zener diode 21, a ground short-circuit diagnosis circuit 23 for load disconnection or a drain D, a power-supply short-circuit diagnosis circuit 24 for over current or the drain D, and a overheat diagnosis circuit 25 respectively serving as a self-diagnosis section, a gate protection circuit 22 serving as a self-protection section, a serial communication control section 27 serving as a communication control section, and a timer circuit 28 serving as a timer section.

The N-type power-MOS transistor 20 is fabricated by using a power semiconductor process. By controlling the gate G of the transistor 20, the transistor 20 is turned on/off to drive a load 3aa connected to the drain D.

The Zener diode 21 is set between the drain D and the gate G. When an inductive load is connected to the drain D, the MOS transistor 20 is prevented from damaging by an electromotive force when the gate G is turned off.

When the ground short-circuit diagnosis circuit 23 for load disconnection or the drain D, a power-supply short-circuit diagnosis circuit 24 for over current or the drain D, or the self-diagnosis circuit of the overheat diagnosis circuit 25 serving as a self-diagnosis section detects an abnormal state corresponding to each circuit, it outputs a signal corresponding to the abnormal state to a diagnosis output control circuit 26, the diagnosis output circuit 26 outputs a signal corresponding to each abnormal state to the electronic control unit 1 through a serial communication control section 27.

Moreover, when the self-diagnosis section detects overheat or overcurrent/power-supply short circuit, the section transfers each trouble detection signal to the gate protection circuit 22 serving as a self-protection section and thereby turns off the MOS transistor 20 and prevent the transistor 20 from damaging.

The serial communication control section 27 performs serial communication with the electronic control section 1, which is constituted of a controller for controlling the signal transceiving timing in accordance with the protocol of serial communication and a transceiver for transceiving a signal in accordance with the above control and receives a driving control signal for each of the above actuators 3a from the electronic control unit 1 while transmitting a diagnosis signal received from the diagnosis output control circuit 26 to the electronic control unit 1. The arithmetic processing section 10 of the electronic control unit 1 includes a serial communication control section (not illustrated) same as the serial communication control section 27.

The timer circuit 28 makes it possible to not only a relay switch but also an actuator requiring PWM (Pulse Width Modulation) driving and pulse driving. That is, the actuators 3a include an actuator for merely performing on/off control such as the relay switch, an actuator requiring PWM driving such as a proportional solenoid used to adjust opening degrees of various valves, and an actuator requiring pulse driving such as an injector. When transmitting driving signals of various types of actuators 3a through time sharing, it is difficult to regularly transmitting a PWM signal to a specific actuator driver 4. Therefore, the actuator drivers 4 of this embodiment are constituted so as to be able to drive not only relay switches but also actuators requiring PWM driving and pulse driving.

Figure 3:
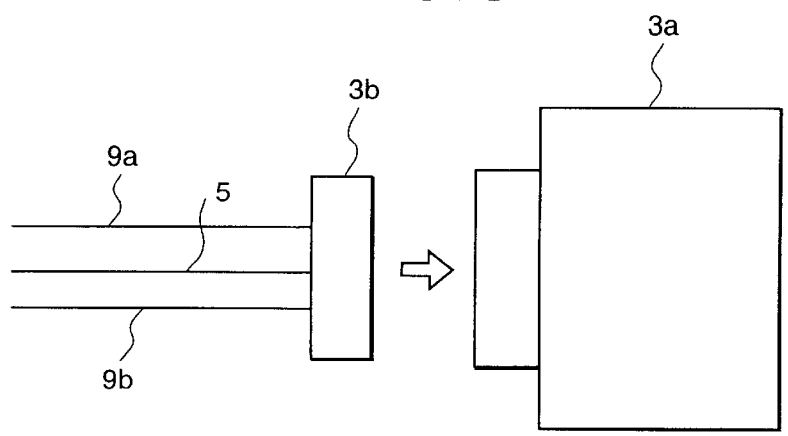
FIG. 3 is an illustration showing the relation between an actuator and an electronic control unit constituting the vehicle control system in FIG. 1.

FIG. 3 shows the relation between the actuator 3a and the serial communication line 5.

As shown in FIG. 3, the connector 3b connected to the actuator 3a is a connector provided for front ends of power-supply lines 9a and 9b for connecting the serial line 5 for connecting the actuator driver 4 with the arithmetic processing section 10 of the electronic control unit 1 with the battery of a vehicle and dispersed actuator drivers 4 are built in the connectors 3b connected to the actuators 3a.

Figure 11:
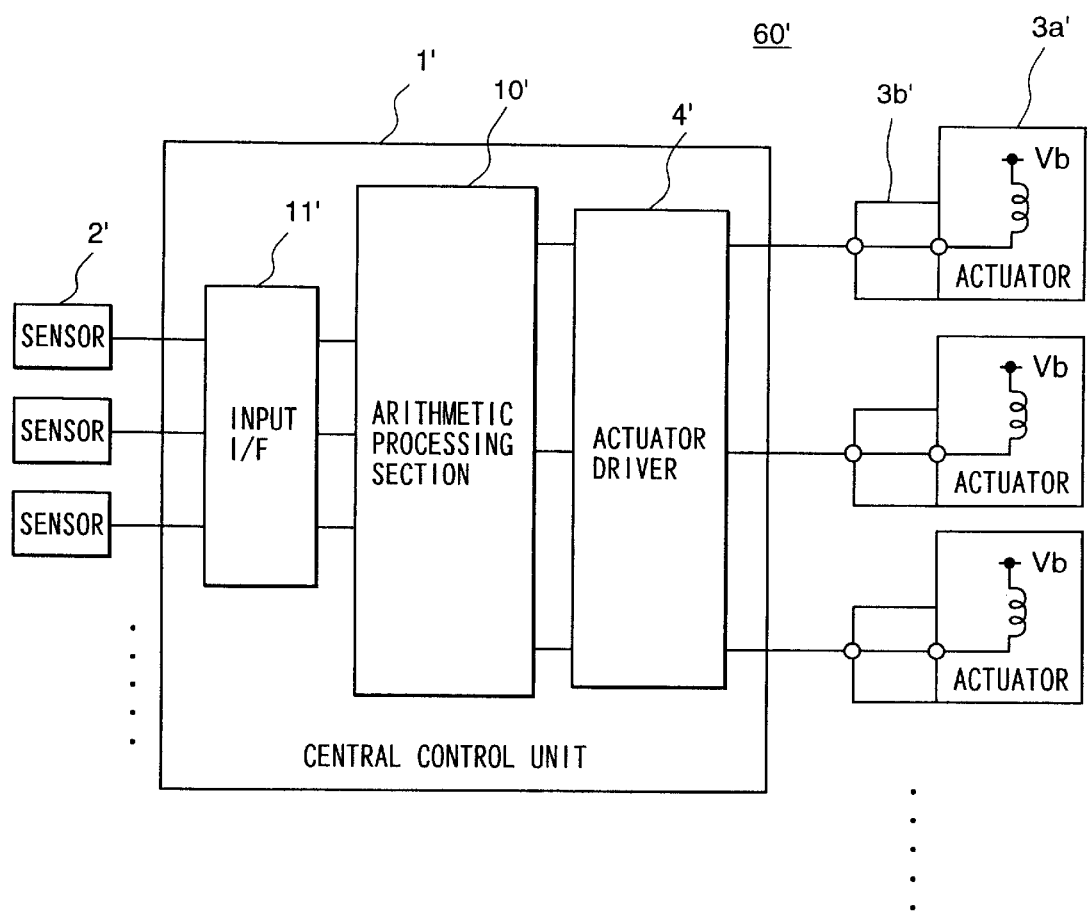
FIG. 11 is a block diagram of a conventional vehicle control system.

Thus, in the case of the configuration of this embodiment for performing multiplex communication through the serial communication line 5, the number of wirings is decreased compared to the configuration (refer to FIG. 11) for individually connecting the electronic control unit 1' with the actuator drivers 4'. Power supplies of the actuator drivers 4 are not restricted to the power-supply lines 9a and 9b but it is also permitted to use power supplies for supplying power from the actuator-3a side.

Figure 4:
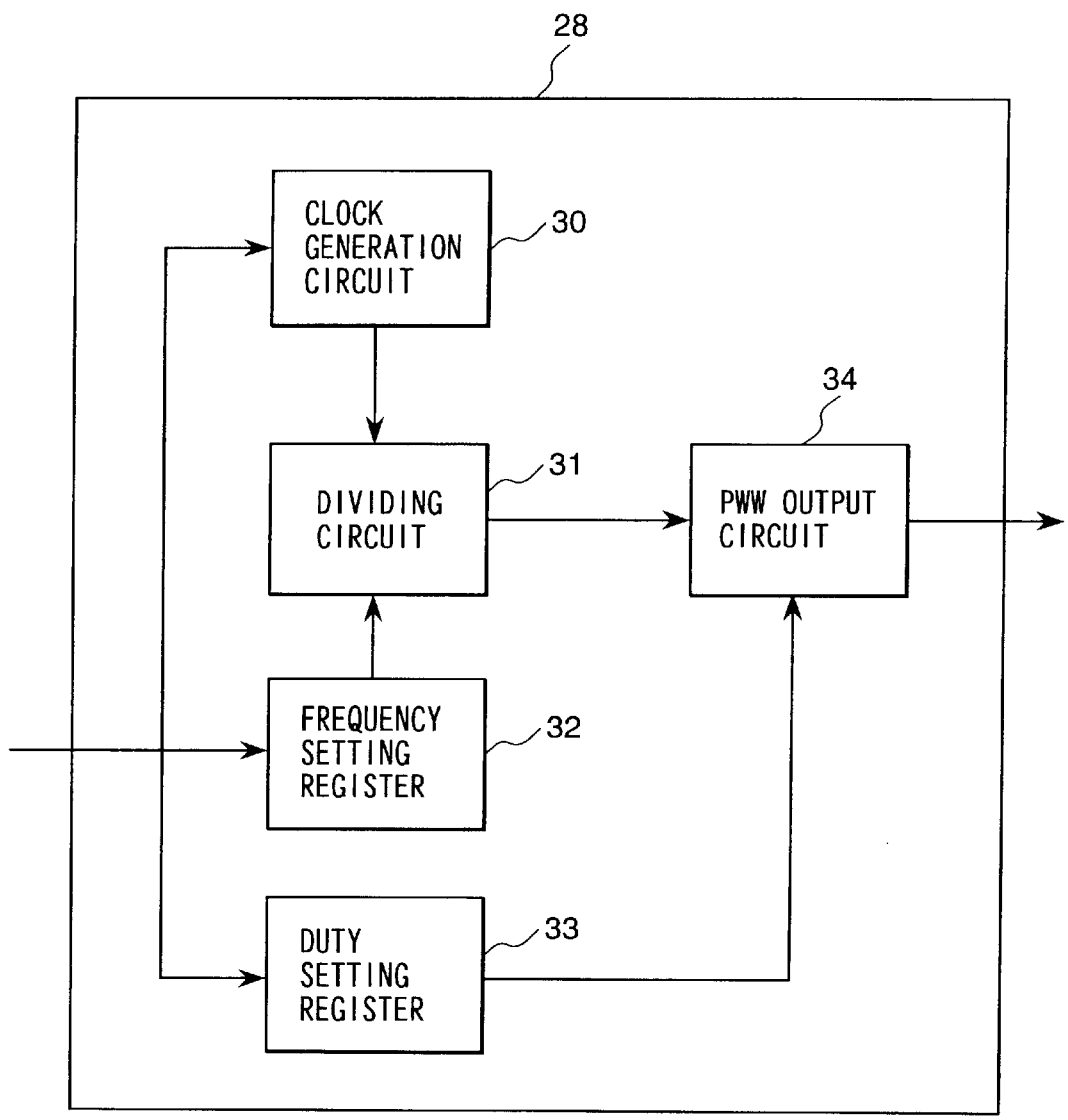
FIG. 4 is a block diagram of a timer circuit built in the actuator driver in FIG. 1.

FIG. 4 shows a block diagram of a timer circuit 28.

The timer circuit 28 is constituted of a clock generation circuit 30, a dividing circuit for dividing a clock generated by the circuit 30, a frequency setting register 32, a duty setting register 33, and a PWM output circuit 34.

As described above, to PWM-drive an actuator by the multiplex communication system, the electronic control unit 1 transmits a PWM frequency setting signal and a duty setting signal for the actuator drivers 4 to the timer circuit 28 through the serial communication line 5. These signals are stored in the frequency setting register 32 and duty setting register 33, and an internal clock is divided by the frequency setting register 32 up to a predetermined PWM frequency and the divided signal is modulated to a PWM signal having a desired duty. Thereby, to change opening degrees of a valve by changing currents to be supplied to a solenoid, the actuator driver 4 can control the amount of current to be supplied to the solenoid merely in accordance with a duty setting signal sent from the electronic control unit 1.

Moreover, the clock generation circuit 30 can self-correct an oscillation frequency in accordance with a waveform pattern sent from the electronic control unit 1 at any time, which is realized as an inexpensive circuit without using a crystal oscillator.

When using a serial communication system having a high-enough signal transmission rate, it is possible to control the actuator 3a in which it is necessary to accurately control the fuel injection timing as the above injector through time sharing by using the actuator driver 4 including the timer circuit 28. Moreover, when a signal transmission rate is low, only the actuator 3a in which the above timing must be accurately controlled is controlled from the electronic control unit 1 through an exclusive communication line.

Figure 5:
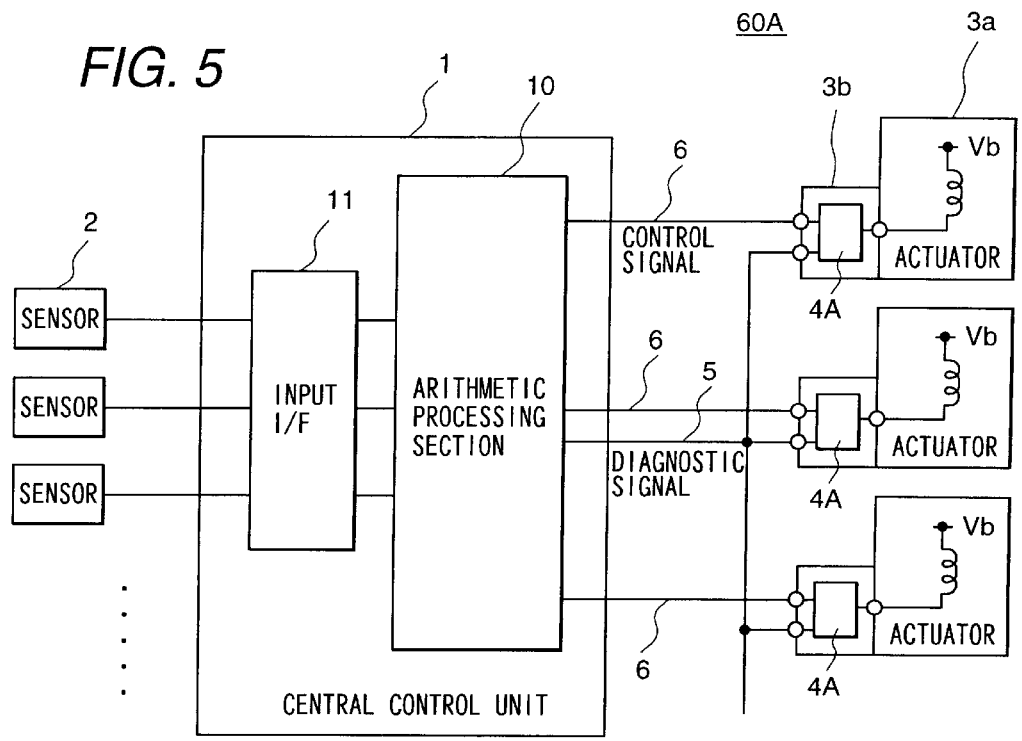
FIG. 5 is a block diagram of a vehicle control system of second embodiment of the present invention.

FIG. 5 shows a block diagram of the vehicle control system of the second embodiment.

The vehicle control system 60A has the same configuration as the vehicle control system 60 of the first embodiment except the configuration of signal lines between the arithmetic processing section 10 of an electronic control unit (ECU) 1A and actuator drivers 4A. Therefore, differences between the first and second embodiments are mainly described below.

The actuator drivers 4A of the vehicle control system 60A are set to the actuator-3a side separately from the electronic control unit 1A and dispersed in connectors 3b correspondingly to the actuators 3a. Moreover, the actuator drivers 4A respectively have a self-diagnosis section, a self-protection section, and a communication control section and made independent so as to make it possible to construct an actual system even if the drivers 4A are set to the outside of the electronic control unit 1A.

Then, the arithmetic processing section 10 of the electronic control unit 1A is connected with the actuator drivers 4A by a serial communication line 5 and a parallel communication line 6, predetermined operations are performed by the electronic control unit 1A in accordance with signals of sensors 2, and a control signal is transmitted from the electronic control unit 1 to each actuator driver 4A through the parallel communication line 6 to drive the actuators 3a. However, only diagnosis signals of the actuators 3a sent from the actuator drivers 4A to the electronic control unit 1A are bundled by the serial communication line 5 and transmitted to the electronic control unit 1A. According to the above configuration, it is not always necessary that the actuator drivers 4A of this embodiment respectively include the timer 28.

Figure 6:
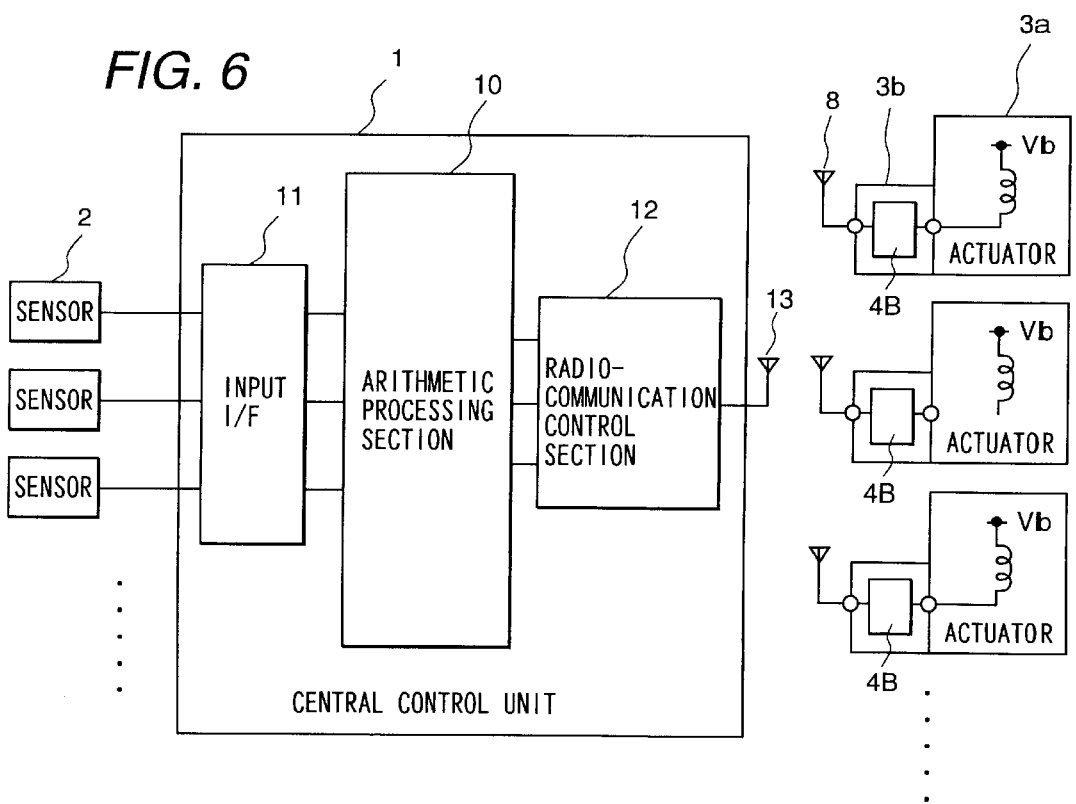
FIG. 6 is a block diagram of a vehicle control system of third embodiment of the present invention.
Figure 7:
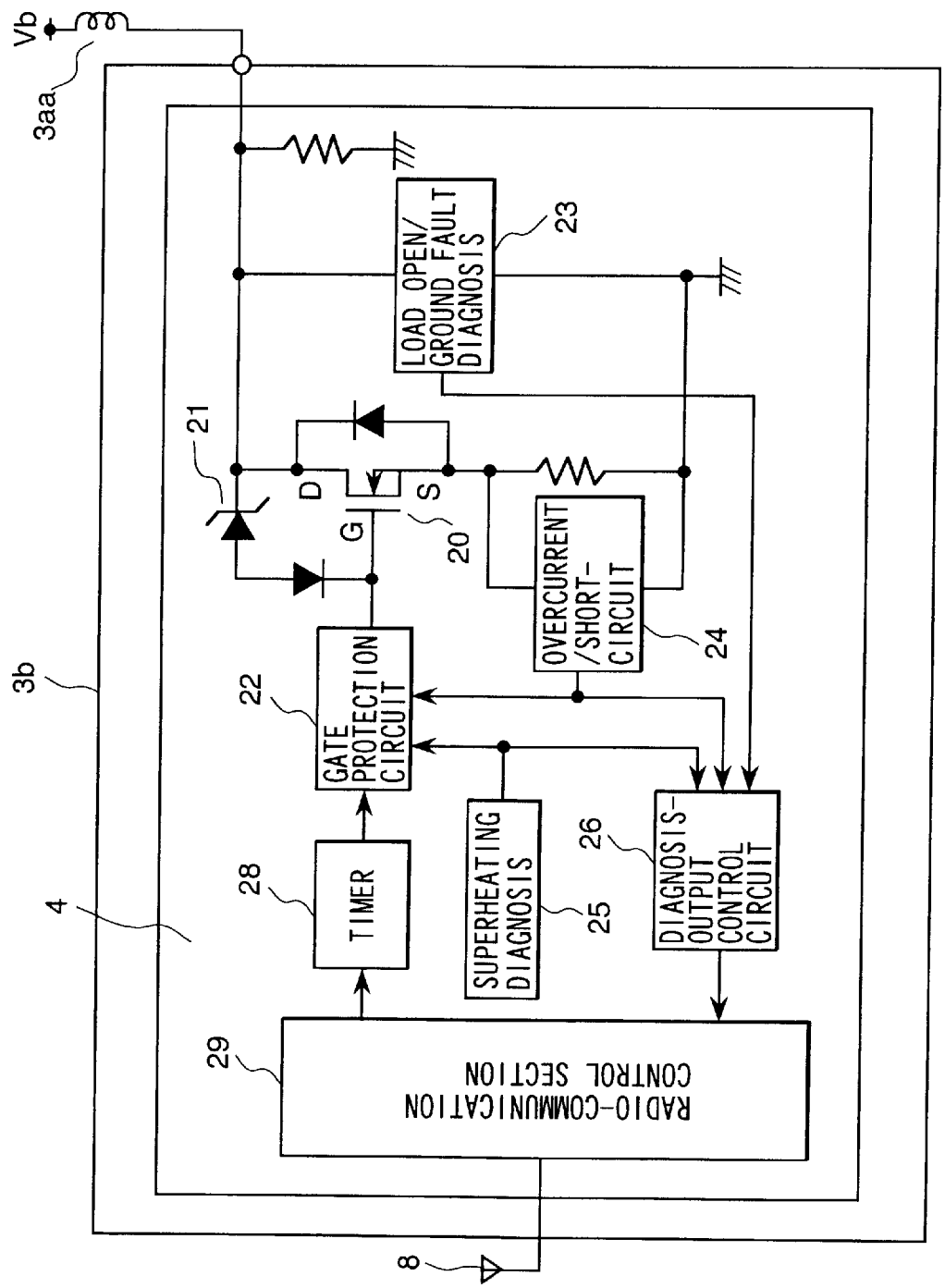
FIG. 7 is a circuit block diagram of an actuator driver constituting the vehicle control system in FIG. 1.

FIGS. 6 and 7 show the vehicle control system of the third embodiment, in which FIG. 6 shows a block diagram of the vehicle control system.

Because the vehicle control system 60B has the same configuration as those of the vehicle control systems of the first and second embodiments except the configuration of transceiving signals between the arithmetic processing unit 10 of an electronic control unit (ECU) 1B and actuator drivers 4B, difference points between the third embodiment on one hand and the first and second embodiments on the other are mainly described below.

The actuator drivers 4B of the vehicle control system 60 are set to the actuator-3a side separately from the electronic control unit 1B and dispersed in connectors 3b correspondingly to the actuators 3a. Moreover, the actuator drivers 4B respectively have a self-diagnosis section, a self-protection section, a timer section, a radio communication control section, and an antenna and are made independent so as to make it possible to construct an actual system even if the drivers 4B are set to the outside of the electronic control unit 1B.

Moreover, signals are transferred between the arithmetic processing unit 10 of the electronic control unit 1B and the actuator drivers 4B through radio. That is, the electronic control unit 1B is constituted of an input interface (input I/F) 11, the arithmetic processing section 10, a radio communication control section 12, and an antenna 13. The arithmetic processing section 10 captures signals obtained by processing signals sent from the sensors 2 from the input I/F 11, performs predetermined operations, and outputs an optimum control signal to the actuator drivers 4 through the radio communication control section 12 and antenna 13. The actuator drivers 4B receive the signals through an antenna 8 to drive the actuators 3a.

Furthermore, as shown in FIG. 7, the actuator drivers 4B respectively include an N-type power MOS transistor 20, a Zener diode 21, a ground short-circuit diagnosis circuit 23 for load disconnection or a drain D, a power-supply short-circuit diagnosis circuit 24 for overcurrent or the drain D, and overheat diagnosis circuit 25 and a diagnosis output control circuit 26 respectively serving as a self-diagnosis section, a gate protection circuit 22 serving as a self-protection section, a radio communication control section 29 serving as a communication control section, an antenna 8, and a timer circuit 28 serving as a timer section. Furthermore, when the ground short-circuit diagnosis circuit for load disconnection or the drain D, the power-supply short-circuit diagnosis circuit 24, or the self-diagnosis circuit of the overheat diagnosis circuit 25 serving as the self-diagnosis section detects an abnormal state corresponding to each circuit, it outputs a signal showing the abnormal state to the diagnosis output control circuit 26 and the diagnosis output control circuit 26 outputs a signal corresponding to each abnormal state to the electronic control unit 1 through the radio communication control section 29.

As described above, the timer circuit 28 is indispensable to perform multiplex communication through time-sharing. However, the circuit 28 is not always necessary when individually communicating between the electronic control unit 1B and the actuator drivers 4B by using radio communication lines having frequencies different from each other.

Figure 8:
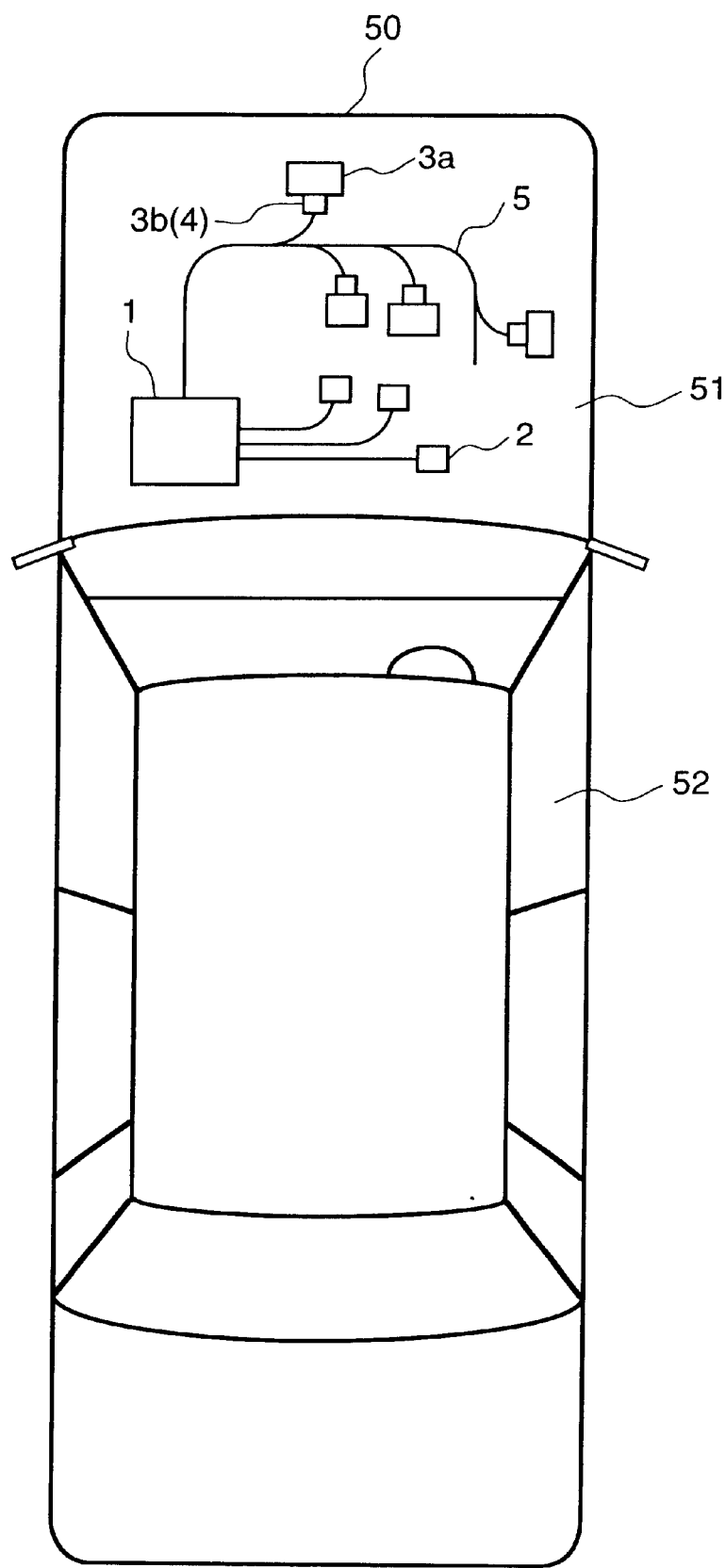
FIG. 8 is a top view of a car using the vehicle control system in FIG. 1.

FIG. 8 shows a car 50 using the vehicle control system 60 of the first embodiment in which the independent actuator drivers 4 are dispersed correspondingly to the actuators 3a to be driven.

In the case of the car 50, an engine control unit serving as an electronic control unit 1 is set not in a cabin 52 but in an engine room 51 having a severer temperature environment in order to reduce the harness cost and man-hours for assembling the car, in which the arithmetic processing section 10 of an electronic control unit 1 performs various operations in accordance with output signals of various sensors 2 such as an engine-speed sensor, water-temperature sensor, and intake-air-flow sensor, outputs a driving signal to actuator drivers 4 for driving an ignition coil, an injector, and various valves through a serial communication line 5 to perform optimum control of an engine. Also in the case of a car using the vehicle control system 60A of the second embodiment or the vehicle control system 60B of the third embodiment, it is also possible to perform optimum control an engine similarly to the case of the above described.

As described above, the embodiments of the present invention have the following functions in accordance with the above configurations.

That is, the vehicle control systems 60, 60A, and 60B of the first to third embodiments make it possible to control the heat produced in the electronic control units 1, 1A, and 1B because the actuator drivers 4, 4A, and 4B are arranged separately from the electronic control units 1, 1A, and 1B. Therefore, radiation components such as a heat sink and a radiation fin are unnecessary for the electronic control units 1, 1A, and 1B and thus, it is possible to reduce the cost of an electronic control unit.

The above mentioned is more effective for a car in which the specification of a temperature environment is particularly severe for an electronic control unit.

Moreover, because the actuator drivers 4, 4A, and 4B producing much heat are dispersed correspondingly to the actuators 3a to be driven by the drivers 4, 4A, and 4B, the heat to be produced by each of the actuator drivers 4, 4A, and 4B becomes comparatively less. Therefore, it is possible to easily take actions for radiation of an actuator driver at the actuator-3a side and downsize the electronic control units 1, 1A, and 1B, and moreover improve the versatility of the electronic control units 1, 1A, and 1B because the same electronic control unit can be used for actuators different in systems.

Furthermore, because of setting the actuator drivers 4, 4A, and 4B to the actuator-3a side, no large current flows through signal lines between the electronic control units 1, 1A, and 1B on one hand and the actuators 3a on the other. Therefore, it is possible to reduce radiation noises from the vehicle control systems 60, 60A, and 60B.

Furthermore, by using the independent actuator drivers 4, 4A, and 4B by which an actual system can be constructed even if the drivers are set to the outside of an electronic control unit, it is possible to securely construct an actuator-driver-dispersed-type system and keep the reliability and functionality of the vehicle control systems 60, 60A, and 60B even if actuator drivers are dispersed.

Furthermore, because each of the actuator drivers 4, 4A, and 4B occupies only a comparatively small area even if including self-diagnosis and self-protection functions, a timer circuit, and a communication control section, it is possible to reduce the cost and size of the whole vehicle control system by a value equivalent to downsizing of an electronic control unit without changing sizes of the dispersed actuator drivers 4, 4A, and 4B.

Furthermore, because the actuator drivers 4, 4A, and 4B are built in connectors 3b, it is possible to share actuators 3a by different systems by constituting the actuator drivers 4, 4A, and 4B separately from the actuators 3a and thereby, improve the versatility of actuators 3a.

Furthermore, when considering that the actuators 3a include various shapes, it can be said that it is superior in productivity to set the driver 4 in the connector 3a whose structure is comparatively simple and which has less variation compare to the case of setting the driver 4 by changing the housing structure every type. Furthermore, it is considered that the temperature around the actuator driver 4 is lowered and it is possible to more easily take actions for radiation by setting the driver 4 in the connector 3b compared to the case of setting it in the actuator 3a.

Furthermore, because the vehicle control system 60 of the first embodiment is an actuator-driver-dispersed-type system using serial communication and is decreased in the number of wirings, it is possible to reduce the wiring cost, wiring weight, and vehicle-assembling man-hours.

Furthermore, because the vehicle control system 60A of the second embodiment an actuator-driver-dispersed-type system using the serial communication line 5 and parallel communication line 6, it is possible to completely correspond to the case in which real-time processing is requested. Furthermore, because the vehicle control system 60B of the third embodiment is an actuator-driver-dispersed-type system using radio communication, it is possible to reduce the number of signal lines and further reduce the cost of the vehicle control system.

Furthermore, the car 50 using the vehicle control systems 60, 60A, and 60B can be produced at a low cost because actions for radiation can be easily taken and the versatility of the electronic control units 1, 1A, and 1B is increased by dispersing the actuator drivers 4, 4A, and 4B though the temperature in the engine room 51 becomes higher than that in the cabin 52.

Though three embodiments of the present invention are described above, the present invention is not restricted to the embodiments. Various modifications can be designed as long as they are not deviated from the gist of the present invention described in claims.

For example, in the case of each of the above embodiments, the actuator drivers 4, 4A, and 4B are built in the connectors 3b. However, it is also permitted that the actuator drivers 4, 4A, and 4B are built in adapters connected to the actuators 3a. In this case, it is possible to construct a control system only by connecting the adapters to the existing actuators 3a and improve the productivity of the system. Moreover, it is permitted that the actuator drivers 4, 4A, and 4B are built in the actuators 3a. Also in this case, the same advantage can be obtained.

Furthermore, the actuator drivers 4, 4A, and 4B are not restricted to the case of being built in the connectors 3b. It is also permitted that the drivers 4, 4A, and 4B are removably mounted on outsides of the connectors 3b connected to the actuators 3a or outsides of the adapters and electrically connected with the connectors 3b or terminals of the adapters.

Figure 9:
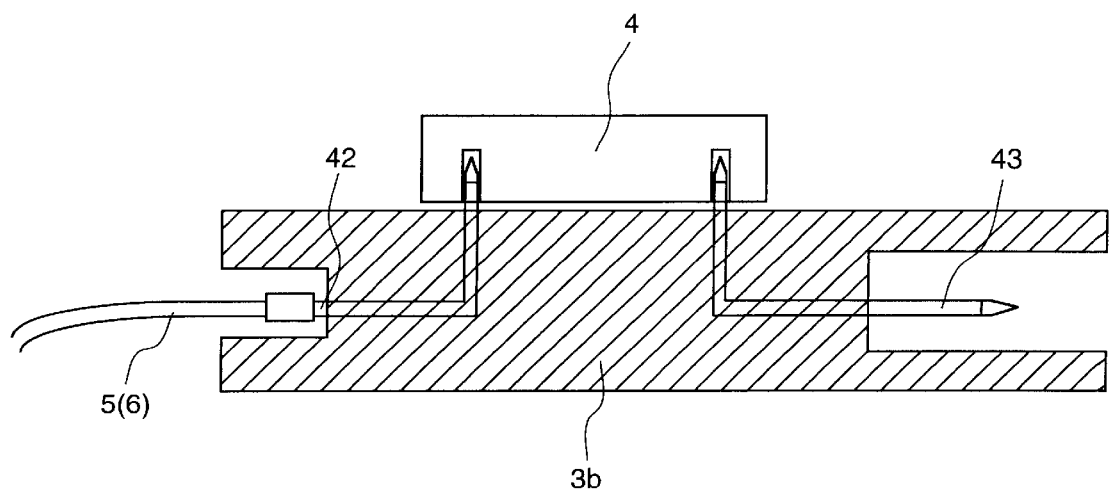
FIG. 9 is a sectional view of a connector on whose outside an actuator driver of the third embodiment is mounted.

FIG. 9 is a sectional view showing a state in which a dispersed actuator driver 4 is removably mounted on the outside of a connector 3b, in which a signal line 5 or 6 extended from an electronic control unit 1 is connected to a connector terminal 42 and a connector at the actuator-3a side is connected to a connector terminal 43.

Moreover, the connector terminals 42 and 43 are protruded beyond the connector 3b. By fitting an actuator driver 4 provided with a self-diagnosis section to the connector terminals 42 and 43, the actuator driver 4 is electrically and mechanically connected with the connector terminals 42 and 43. Thus, by removably mounting the actuator driver 4 on the outside of the connector 3b, it is possible to change only the actuator driver 4 without changing the connector 3b. Therefore, an advantage is obtained that the above case is superior in productivity and maintainability.

Figure 10:
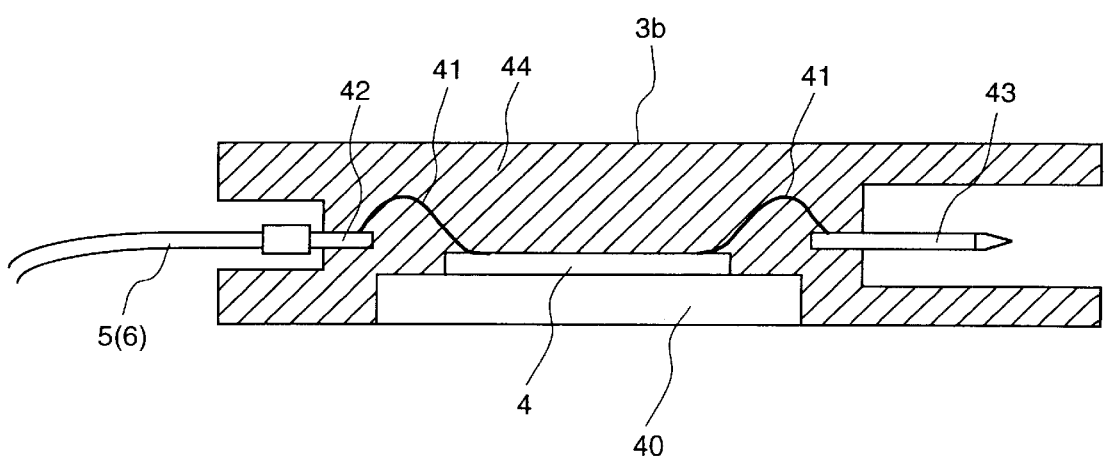
FIG. 10 is a sectional view of a connector including an actuator driver of the third embodiment.

FIG. 10 shows a mounting mode when an actuator driver 4 is built in a connector 3b, which is a sectional view of a driver-included connector using a lead frame.

A signal line 5 or 6 extended from an electronic control unit 1 is connected to a connector terminal 42 and a connector at the actuator-3a side is connected to a connector terminal 43.

Then, the actuator driver 4 provided with a self-diagnosis section serves as a one-chip IC or a multi-chip IC constituted of a plurality of ICs fabricated on a silicon wafer serving as a semiconductor substrate by using a BCD process in which a bipolar process, a power semiconductor process (DMOS process), and a CMOS process are united.

This IC is bonded onto a metallic member (metallic base) 40 of a lead frame by a conductive adhesive not through a substrate. The IC serving as the driver 4 is wire-bonded with the connector terminals 42 and 43 by an aluminum wire or gold wire 41 and then, the driver-included connector 3b is integrally formed by using a resin 44 and thereby transfer-molding the whole.

The metallic base 40 is exposed toward the outside of the connector 3b, which also functions as a radiation plate of the IC serving as the driver 4 but the radiation performance of the base 40 is not deteriorated by mold-mounting it. Moreover, by integrally forming the actuator driver 4 and the connector 3b through transfer-mold mounting, it is possible to realize the driver-included connector 3b at a low cost by decreasing the number of fabrication steps. It is also permitted to form the actuator driver 4 integrally with the adapter or actuator.

As understood from the above description, in the case of a vehicle control system of the present invention, actuator drivers are dispersed to the actuator side and made independent. Therefore, it is possible to reduce the cost of the control system by controlling the heat produced in an electronic control unit and keep the reliability and functionality of the control system after the actuator drivers are dispersed.

Moreover, by using the above-described vehicle control system, it is possible to produce a low-cost car.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A vehicle control system comprising an electronic control unit and a plurality of actuators, said control system including actuator drivers for driving the actuators, each of said actuator drivers being provided on the side of each actuator, and each of said actuator drivers being provided with a self-diagnosis section, a self-protection section, and a communication control section so as to obtain independent diagnosis operations.

2. The vehicle control system according to claim 1, wherein the actuator drivers respectively have a timer.

3. The vehicle control system according to claim 1, wherein the actuator drivers are built in connectors or adapters connected to the actuators.

4. The vehicle control system according to claim 1, wherein the actuator drivers are removably mounted on outsides of connectors or adapters connected to the actuators and electrically connected with terminals of the connectors or adapters.

5. The vehicle control system according to claim 1, wherein the actuator drivers are built in the actuators.

6. The vehicle control system according to claim 1, wherein the communication control section of the actuator drivers respectively have a serial communication section.

7. The vehicle control system according to claim 1, wherein the communication control section of each of the actuator drivers has a radio communication control section.

8. The vehicle control system according to claim 1, wherein the actuator drivers are fabricated on a semiconductor substrate and respectively used as an IC.

9. The vehicle control system according to claim 3, wherein the actuator drivers are directly mounted on a metallic member not through a substrate and formed integrally with connectors or adapters connected to the actuators or integrally with the actuators.

10. The vehicle control system according to claim 1, wherein the electronic control unit is set in the engine room of a vehicle.

11. A car having a plurality of actuators configured to control vehicular components using a vehicle control system according to claim 1.

12. The vehicle control system according to claim 3, wherein the actuator drivers respectively have a timer.

13. The vehicle control system according to claim 4, wherein the actuator drivers respectively have a timer.

14. The vehicle control system according to claim 5, wherein the actuator drivers respectively have a timer.

15. The vehicle control system according to claim 6, wherein the actuator drivers respectively have a timer.

16. The vehicle control system according to claim 15, wherein the actuator drivers are built in connectors or adapters connected to the actuators.

17. The vehicle control system according to claim 16, wherein the actuator drivers are removably mounted on outsides of connectors or adapters connected to the actuators and electrically connected with terminals of the connectors or adapters.

18. The vehicle control system according to claim 17, wherein the actuator drivers are built in the actuators.

19. The vehicle control system according to claim 7, wherein the actuator drivers respectively have a timer.

20. The vehicle control system according to claim 19, wherein the actuator drivers are built in connectors or adapters connected to the actuators.

21. The vehicle control system according to claim 20, wherein the actuator drivers are removably mounted on outsides of connectors or adapters connected to the actuators and electrically connected with terminals of the connectors or adapters.

22. The vehicle control system according to claim 21, wherein the actuator drivers are built in the actuators.

23. The vehicle control system according to claim 8, wherein the actuator drivers respectively have a timer.

24. The vehicle control system according to claim 23, wherein the actuator drivers are built in connectors or adapters connected to the actuators.

25. The vehicle control system according to claim 24, wherein the actuator drivers are removably mounted on outsides of connectors or adapters connected to the actuators and electrically connected with terminals of the connectors or adapters.

26. The vehicle control system according to claim 25, wherein the actuator drivers are built in the actuators.

27. The vehicle control system according to claim 26, wherein the communication control section of the actuator drivers respectively have a serial communication section.

28. The vehicle control system according to claim 5, wherein the actuator drivers are directly mounted on a metallic member not through a substrate and formed integrally with connectors or adapters connected to the actuators or integrally with the actuators.

29. The vehicle control system according to claim 10, wherein he actuator drivers respectively have a timer.

30. The vehicle control system according to claim 11, wherein he actuator drivers respectively have a timer.

* * * * *